(12) United States Patent
Saruwatari

(10) Patent No.: US 8,218,243 B2
(45) Date of Patent: Jul. 10, 2012

(54) ZOOM LENS AND IMAGE PICKUP APPARATUS INCLUDING THE SAME

(75) Inventor: Hiroshi Saruwatari, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 63 days.

(21) Appl. No.: 12/939,664

(22) Filed: Nov. 4, 2010

(65) Prior Publication Data
US 2011/0115946 A1     May 19, 2011

(30) Foreign Application Priority Data
Nov. 16, 2009   (JP) .................................. 2009-260832

(51) Int. Cl.
*G02B 15/14* (2006.01)
(52) U.S. Cl. ........................................ 359/682; 359/684
(58) Field of Classification Search .................. 359/680, 359/682, 683, 684
See application file for complete search history.

(56) References Cited

U.S. PATENT DOCUMENTS

| 6,124,984 A | 9/2000 | Shibayama et al. |
| 7,212,349 B2 | 5/2007 | Mitsuki |
| 2010/0254023 A1* | 10/2010 | Ito .................................. 359/682 |
| 2011/0176222 A1* | 7/2011 | Ito .................................. 359/682 |

FOREIGN PATENT DOCUMENTS

JP        62-200316 A        9/1987

* cited by examiner

*Primary Examiner* — David N Spector
(74) *Attorney, Agent, or Firm* — Rossi, Kimms & McDowell LLP

(57) ABSTRACT

Provided is a zoom lens including, in order from an object side to an image side: a first lens unit having a negative refractive power; a second lens unit having a positive refractive power; and a third lens unit having a positive refractive power, all the lens units moving during zooming; and a secondary aperture having a constant aperture diameter disposed on the image side of the second lens unit, in which the second lens unit includes lens components having a positive refractive powers disposed at a position closest to the object side and a position closest to the image side, and a distance (dd) on an optical axis between a lens surface closest to the image side in the second lens unit and the secondary aperture, and a focal length (fw) of the entire zoom lens at a wide angle end are appropriately set.

11 Claims, 9 Drawing Sheets

ZOOM LENS AND IMAGE PICKUP APPARATUS INCLUDING THE SAME

BACKGROUND OF THE INVENTION

1. Field of the Invention

The present invention relates to a zoom lens, which is suitable for an image pickup apparatus, such as a digital still camera, a video camera, and a TV camera.

2. Description of the Related Art

In recent years, an image pickup apparatus (camera) using a solid-state image pickup element, such as a video camera and a digital still camera has been downsized and developed to have high-performance. Then, due to the downsizing and high-performance of the image pickup apparatus, an optical system used therefor is required to include a wide field angle and to be a small zoom lens with a high zoom ratio, a large aperture ratio, and high optical performance. This type of camera includes various optical elements such as a low pass filter and a color correction filter disposed between the lens rearmost part and the image pickup element. Therefore, the zoom lens used for the image pickup apparatus is required to have a relatively long back focus. Further, in the case of a color camera using an image pickup element for a color image, the image pickup element is expected to have good telecentric characteristic on the image side so as to avoid color shading.

There is known a negative lead type zoom lens in which a negative refractive power lens unit is disposed closest to the object side, as a zoom lens with a small size of the entire system having a long back focus and good telecentric characteristic on the image side. As the negative lead type zoom lens, there is known a three-unit zoom lens having good telecentric characteristic on the image side, which includes, in order from the object side to the image side, a first lens unit having a negative refractive power, a second lens unit having a positive refractive power, and a third lens unit having a positive refractive power (Japanese Patent Application Laid-Open No. S62-200316, U.S. Pat. No. 6,124,984, U.S. Pat. No. 7,212,349).

In order to downsize the entire system of the zoom lens while achieving a high zoom ratio in a negative lead type three-unit zoom lens, it is effective to enhance a refractive power of each lens unit constituting the zoom lens. In addition, in order to realize a compact image pickup apparatus, it is effective to adopt a so-called retractable type, in which the interval between lens units is reduced during the non-image-taking period to an interval different from that in the image-taking state so as to reduce an extending amount of the lens from a main body of the image pickup apparatus. However, if the refractive power of each lens unit is simply enhanced for realizing a wide field angle and a high zoom ratio with a small size of the entire system of the zoom lens, for example, aberration variation due to zooming increases so that it becomes difficult to obtain high optical performance over the entire zoom range.

Other than that, if a movement amount of each lens unit during zooming and focusing is large, the total lens length is increased. Therefore, in order to obtain a desired retractable length, a complicated lens barrel structure is required. In general, the movement amount of each lens unit has a large correlation with the zoom ratio, and hence the above-mentioned tendency becomes conspicuous as the zoom ratio increases. In addition, in order to achieve a large aperture ratio, the lens unit having an aperture stop is increased in size so that the diameter of the marginal light beam increases. Therefore, it is necessary to increase the number of lenses or to take other similar countermeasures in order to correct the aberration sufficiently. If the number of lenses constituting each lens unit is increased, the total lens length in the retracted state increases so that it becomes difficult to downsize the camera.

Because of those reasons, it is important in the negative lead type three-unit zoom lens to set appropriately the lens structure of each lens unit in order to downsize the entire system of the zoom lens while achieving a wide field angle and a high zoom ratio as well as a desired retractable length. For instance, if a wide field angle and a high zoom ratio are to be attained without appropriate setting of the lens structure of the second lens unit and movement conditions of the first lens unit and the second lens unit during zooming, a front lens effective diameter increases at the wide angle side, and the size of the entire zoom lens increases.

SUMMARY OF THE INVENTION

A zoom lens according to the present invention includes, in order from an object side to an image side: a first lens unit having a negative refractive power; a second lens unit having a positive refractive power; and a third lens unit having a positive refractive power, all the first lens unit, the second lens unit, and the third lens unit moving during zooming; and a secondary aperture having a constant aperture diameter disposed on the image side of the second lens unit, in which the second lens unit includes lens components having a positive refractive powers disposed at a position closest to the object side and a position closest to the image side, and in which the following condition is satisfied: $0.10<dd/fw<0.40$, where dd denotes a distance on an optical axis between a lens surface closest to the image side in the second lens unit and the secondary aperture, and fw denotes a focal length of the entire zoom lens at a wide angle end.

According to the present invention, it is possible to obtain a zoom lens having the entire compact lens system, a wide field angle, a high zoom ratio, and high optical performance over the entire zoom range.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

A zoom lens of the present invention includes, in order from an object side to an image side, a first lens unit having a negative refractive power, a second lens unit having a positive refractive power, and a third lens unit having a positive refractive power. Then, all the lens units are moved during zooming. Specifically, during zooming from the wide angle end to the telephoto end, the first lens unit moves along a locus convex toward the image side, the second lens unit moves to the object side monotonously, and the third lens unit moves to the image side.

Figure 1:
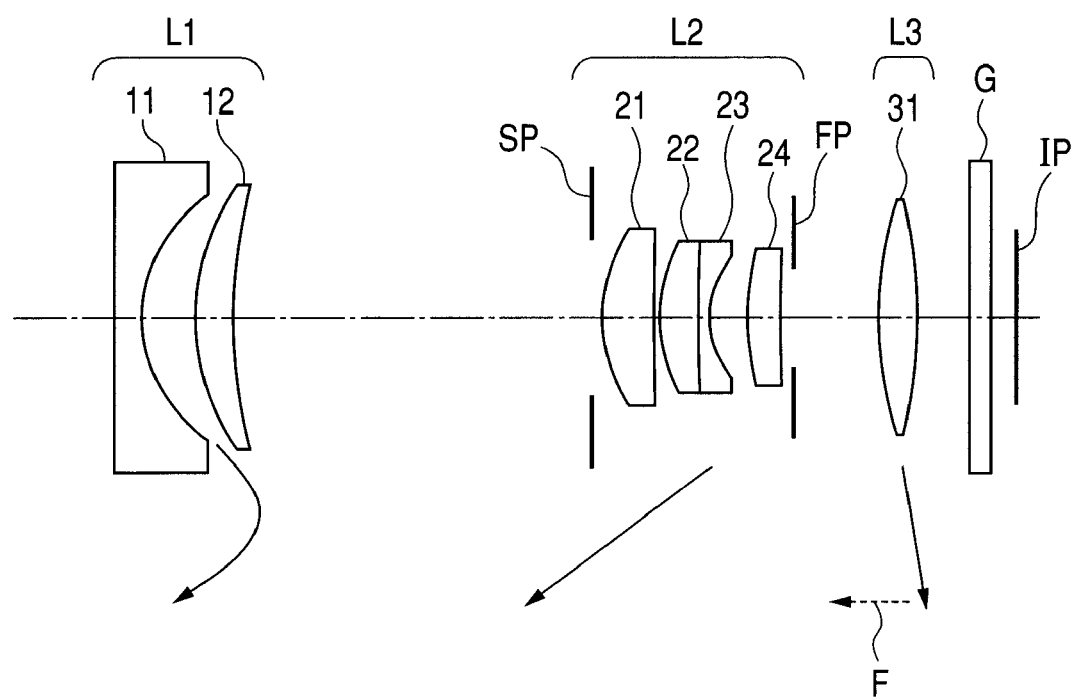
FIG. 1 is a lens cross section at a wide angle end of a zoom lens according to a first embodiment.
Figure 2A:
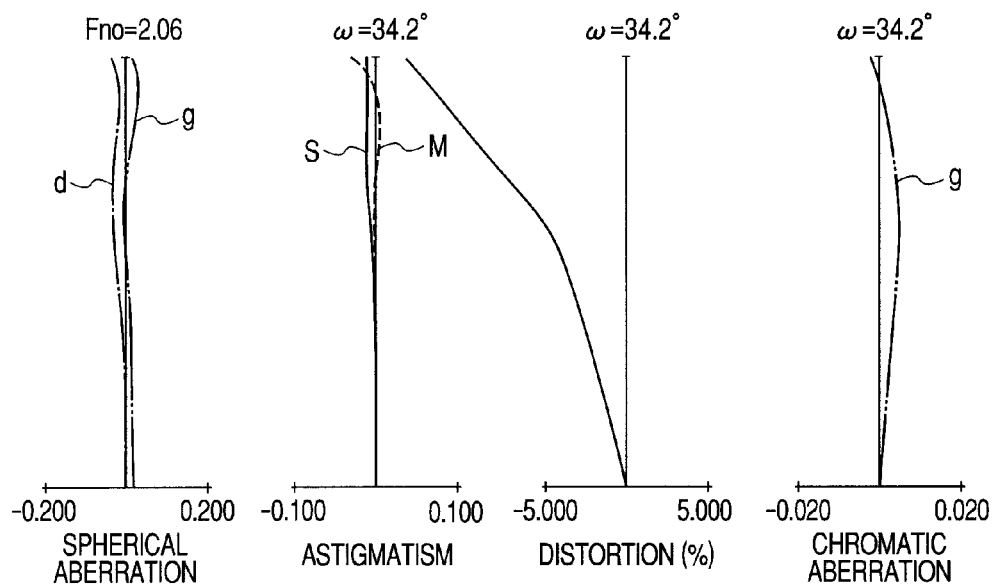
FIGS. 2A and 2B are aberration diagrams at the wide angle end and a telephoto end of the zoom lens according to the first embodiment.
Figure 2B:
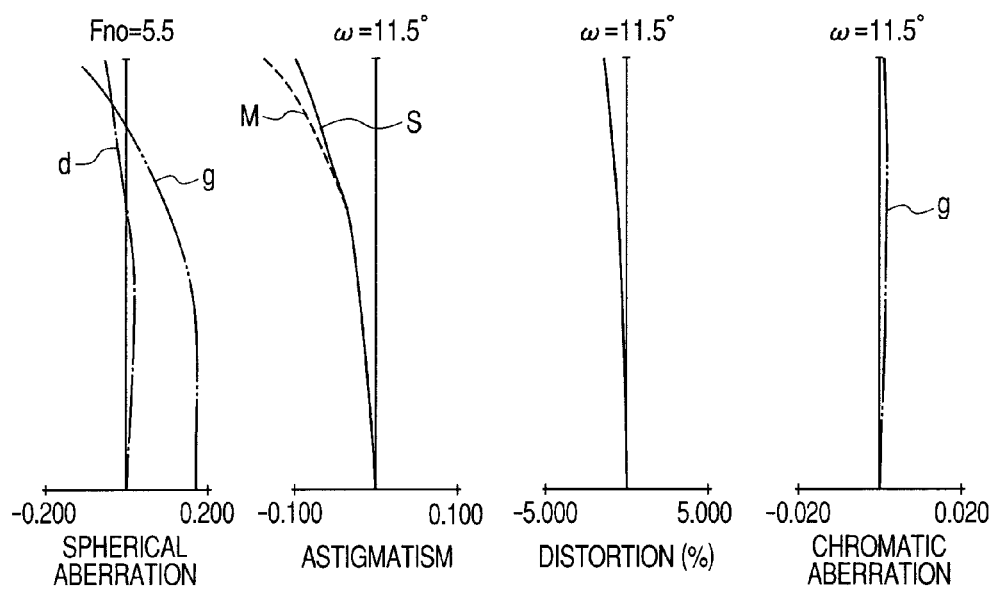

FIG. 1 is a lens cross section at a wide angle end (short focal length end) of a zoom lens according to a first embodiment of the present invention. FIGS. 2A and 2B are aberration diagrams at the wide angle end and a telephoto end (long focal length end) of the zoom lens according to the first embodiment. The first embodiment is the zoom lens having a zoom ratio of 3.8, an aperture ratio of 2.06 to 5.50, and an imaging field angle of 34.21 to 11.53 degrees.

Figure 3:
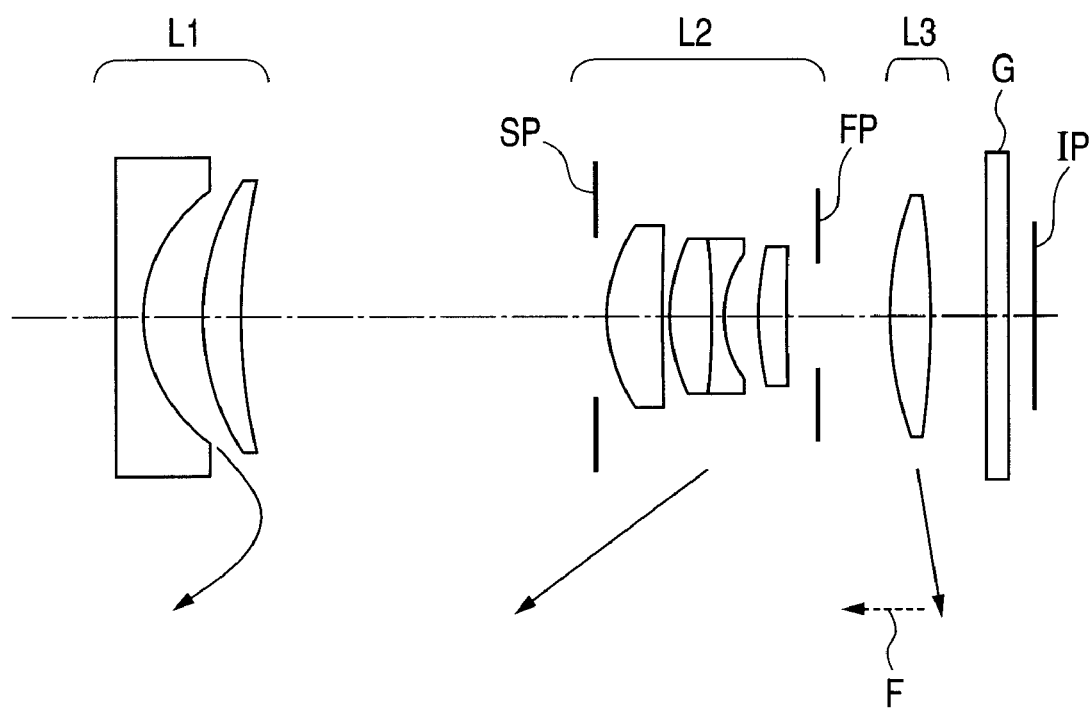
FIG. 3 is a lens cross section at a wide angle end of a zoom lens according to a second embodiment.
Figure 4A:
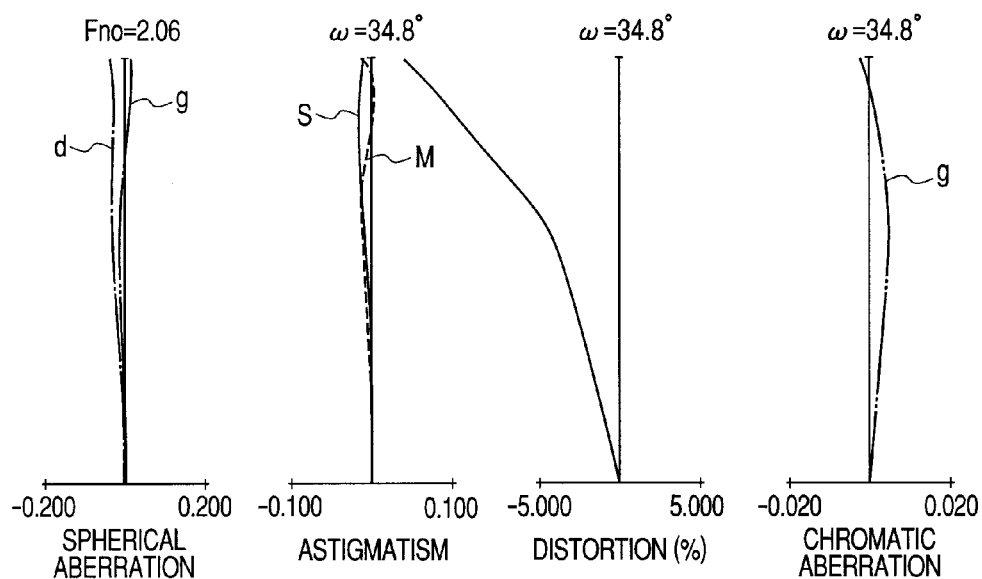
FIGS. 4A and 4B are aberration diagrams at the wide angle end and a telephoto end of the zoom lens according to the second embodiment.
Figure 4B:
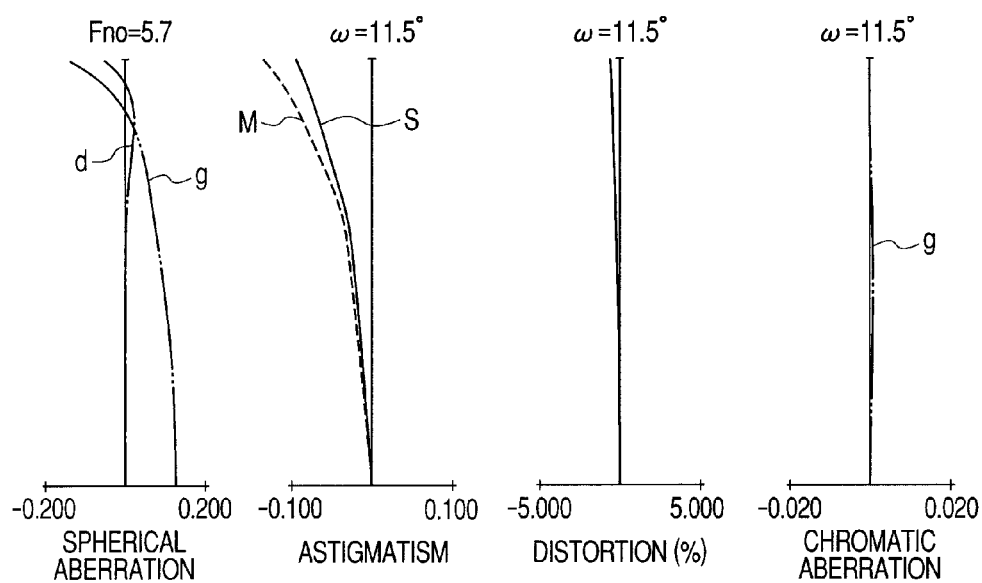

FIG. 3 is a lens cross section at a wide angle end of a zoom lens according to a second embodiment of the present invention. FIGS. 4A and 4B are aberration diagrams at the wide angle end and a telephoto end of the zoom lens according to the second embodiment. The second embodiment is the zoom lens having a zoom ratio of 3.88, an aperture ratio of 2.06 to 5.70, and an imaging field angle of 34.76 to 11.53 degrees.

Figure 5:
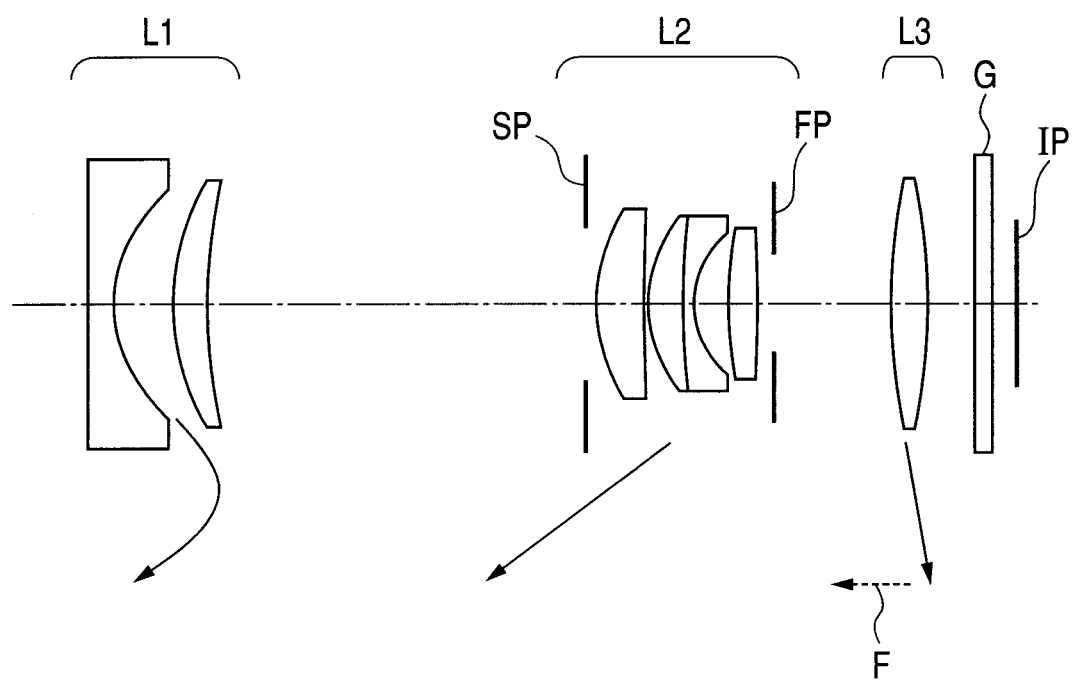
FIG. 5 is a lens cross section at a wide angle end of a zoom lens according to a third embodiment.
Figure 6A:
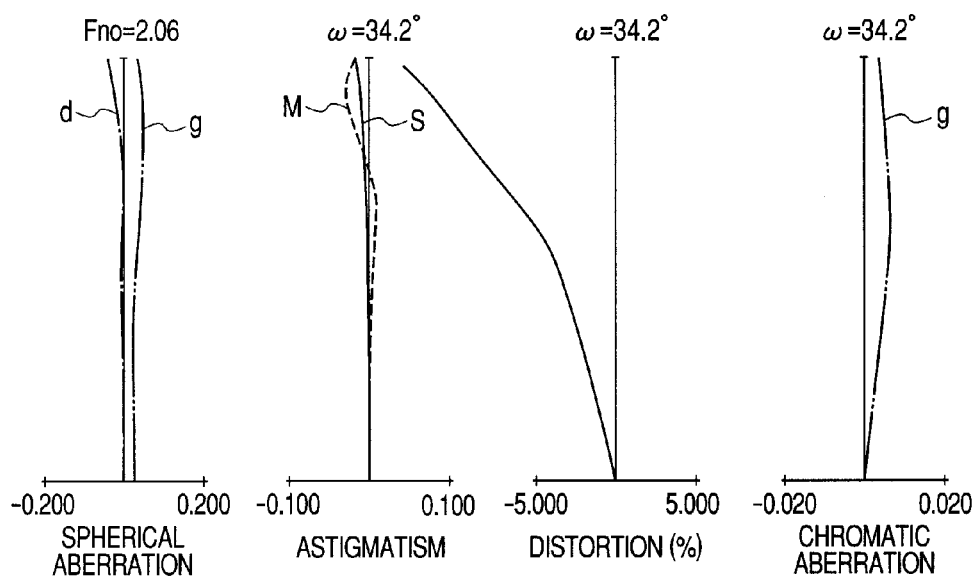
FIGS. 6A and 6B are aberration diagrams at the wide angle end and a telephoto end of the zoom lens according to the third embodiment.
Figure 6B:
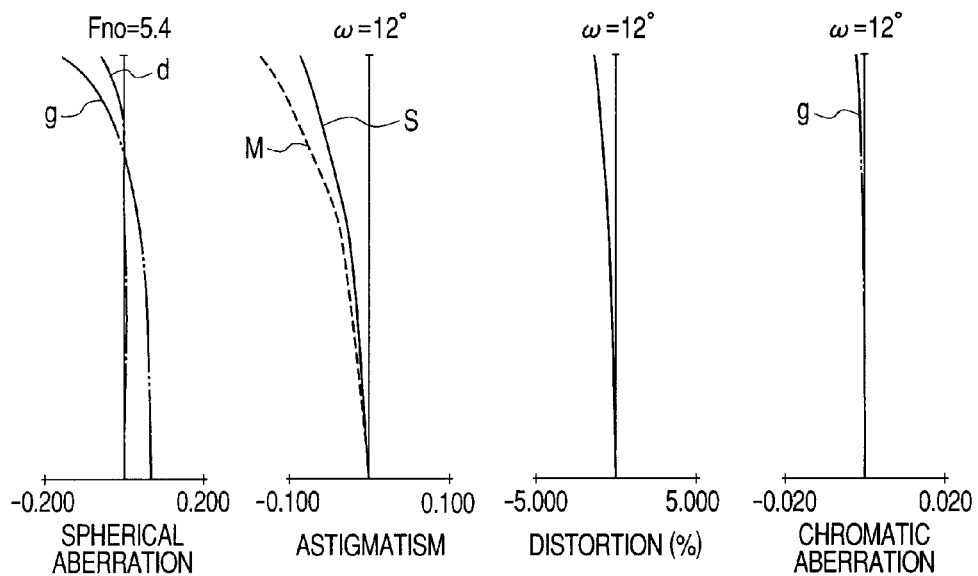

FIG. 5 is a lens cross section at a wide angle end of a zoom lens according to a third embodiment of the present invention. FIGS. 6A and 6B are aberration diagrams at the wide angle end and a telephoto end of the zoom lens according to the third embodiment. The third embodiment is the zoom lens having a zoom ratio of 3.66, an aperture ratio of 2.06 to 5.40, and an imaging field angle of 34.22 to 11.96 degrees.

Figure 7:
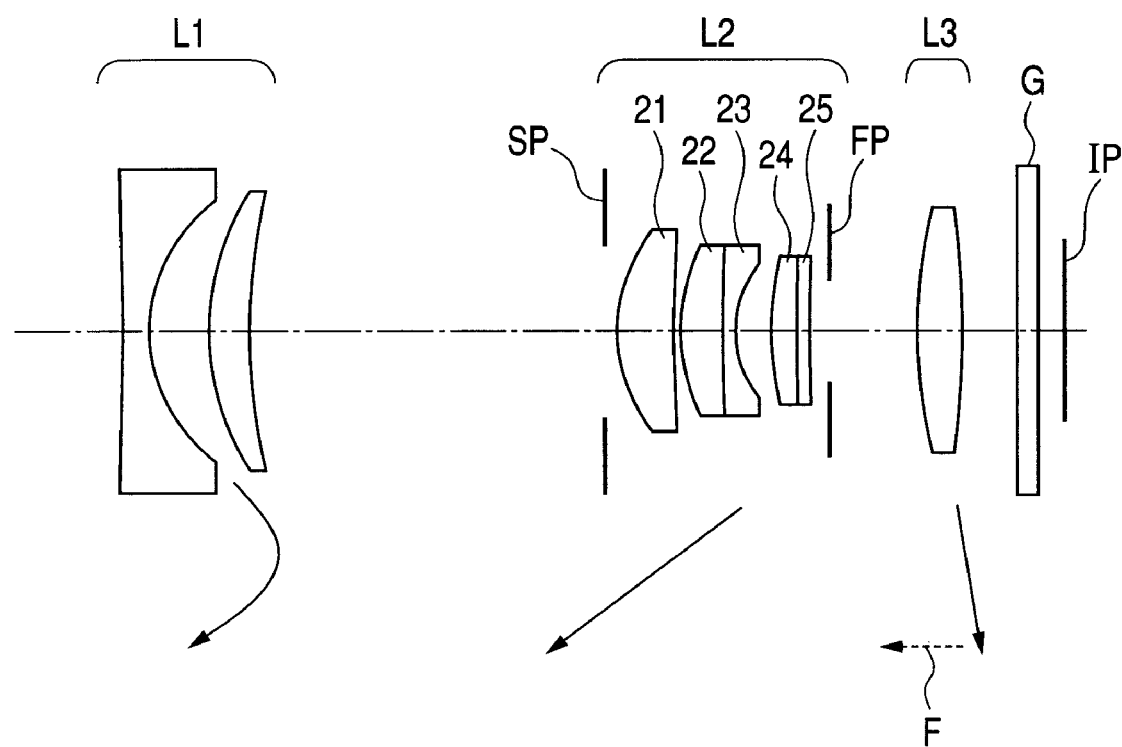
FIG. 7 is a lens cross section at a wide angle end of a zoom lens according to a fourth embodiment.
Figure 8A:
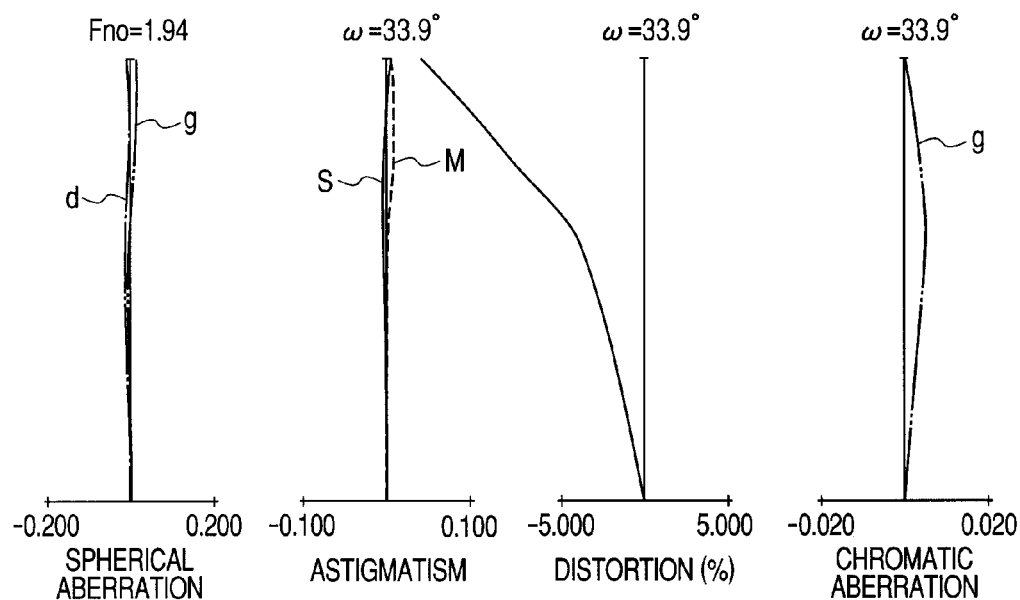
FIGS. 8A and 8B are aberration diagrams at the wide angle end and a telephoto end of the zoom lens according to the fourth embodiment.
Figure 8B:
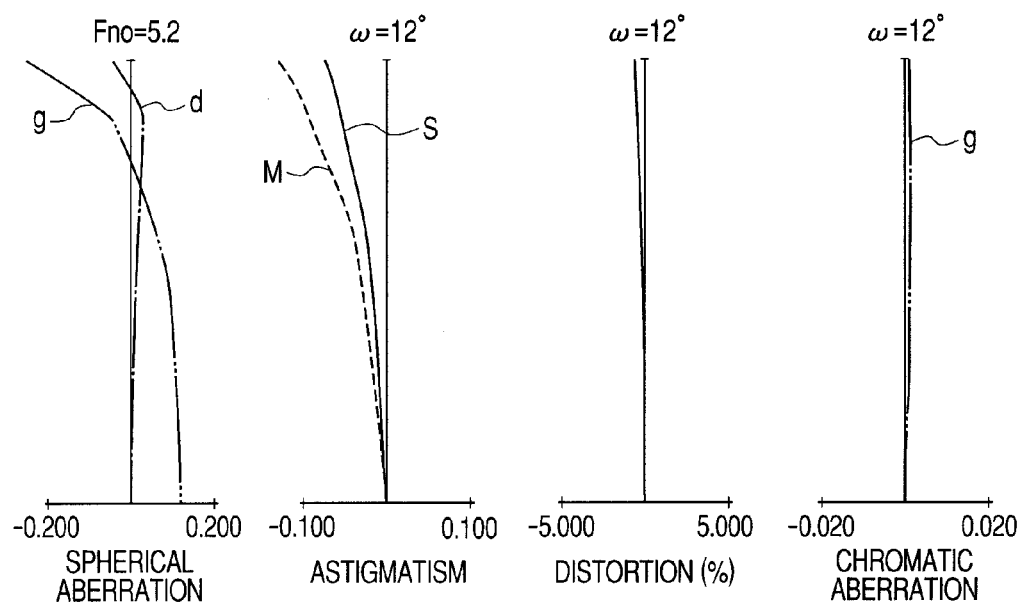

FIG. 7 is a lens cross section at a wide angle end of a zoom lens according to a fourth embodiment of the present invention. FIGS. 8A and 8B are aberration diagrams at the wide angle end and a telephoto end of the zoom lens according to the fourth embodiment. The fourth embodiment is the zoom lens having a zoom ratio of 3.61, an aperture ratio of 1.94 to 5.20, and an imaging field angle of 33.87 to 11.96 degrees.

Figure 9:
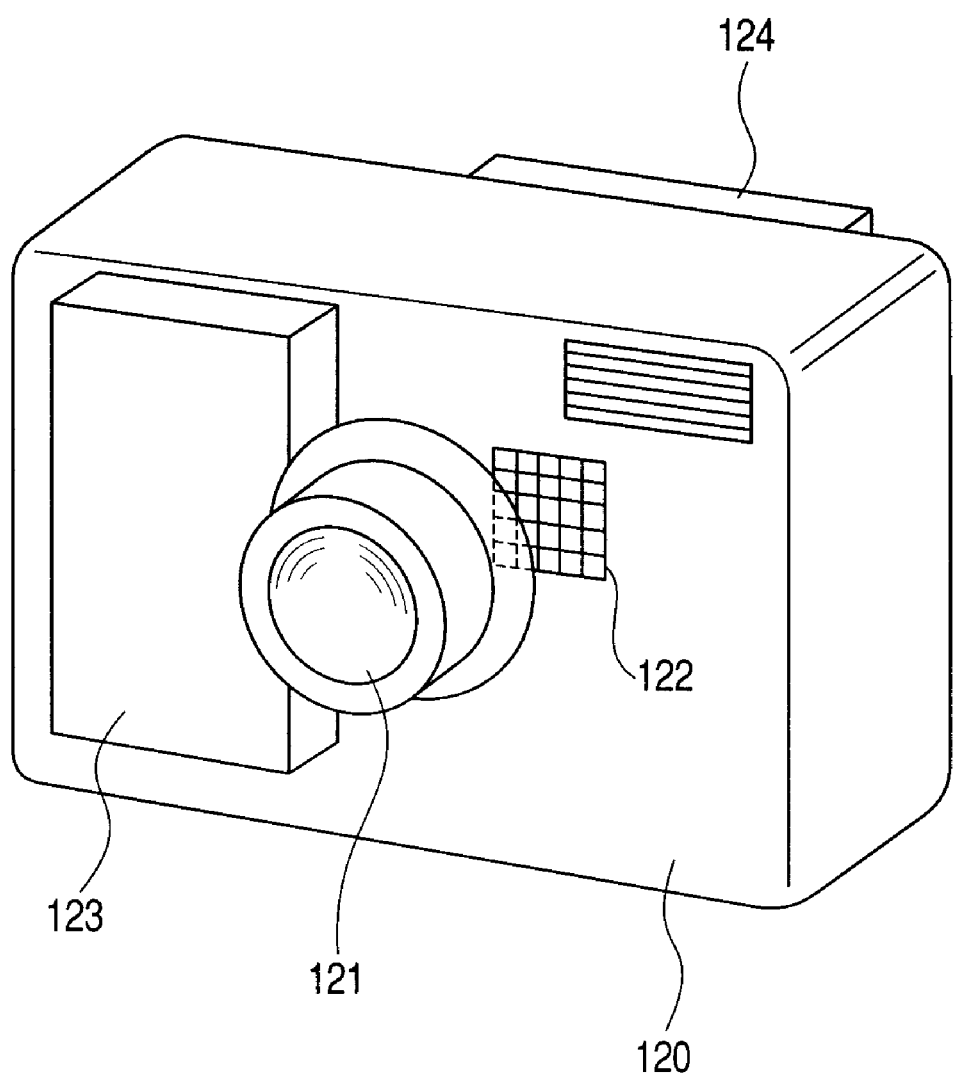
FIG. 9 is a schematic diagram of a main part of an image pickup apparatus according to the present invention.

FIG. 9 is a schematic diagram of a main part of a digital still camera including a zoom lens according to the present invention. The zoom lens of each embodiment is an image taking lens system that is used for an image pickup apparatus. In the lens cross section, the left side corresponds to the object side (front), and the right side corresponds to the image side (rear). Note that, when the zoom lens of each embodiment is used for optical equipment such as a projector, the left side corresponds to a screen, and the right side corresponds to an image to be projected.

In the lens cross section, the zoom lens of each embodiment includes the first lens unit L1 having a negative refractive power (optical power=reciprocal of focal length), the second lens unit L2 having a positive refractive power, and the third lens unit L3 having a positive refractive power. An F number determining member (hereinafter also referred to as "aperture stop") SP has a function of an aperture stop that determines (restricts) an open F number (Fno) light flux. A secondary aperture FP has a constant aperture diameter. An optical block G is an optical filter, a face plate, a quartz low-pass filter, an infrared cut filter, or the like. As an image plane IP, an imaging plane of a solid-state image pickup element (photoelectric transducer) such as a CCD sensor or a CMOS sensor is disposed when the zoom lens is used as an image taking optical system of a video camera or a digital still camera.

Among the aberration diagrams, a spherical aberration diagram is illustrated by a d-line and a g-line. The F number is denoted by Fno. In an astigmatism diagram, a meridional image plane and a sagittal image plane are denoted by M and S, respectively. Lateral chromatic aberration is illustrated by the g-line. A half field angle is denoted by $\omega$. Note that, the wide angle end and the telephoto end in each embodiment described below mean zoom positions when a lens unit for zooming (second lens unit L2) is positioned at each end of the mechanically movable range on the optical axis.

In the lens cross section, the arrow indicates a moving locus of each lens unit during zooming from the wide angle end to the telephoto end, and a movement direction of each lens unit during focusing from an infinite object to a short distance object.

In the zoom lens of each embodiment, during zooming from the wide angle end to a zoom position at the telephoto end, the first lens unit L1 moves along a part of locus convex toward the image side, in a substantially reciprocating manner so as to correct image plane variation accompanying zooming. The second lens unit L2 moves to the object side monotonously so as to perform main zooming. The third lens unit L3 moves to the image side. In this case, during zooming from the wide angle end to the telephoto end, each lens unit moves so that the interval between the first lens unit L1 and the second lens unit L2 decreases while the interval between the second lens unit L2 and the third lens unit L3 increases. The third lens unit is moved to the object side as illustrated by the arrow F so as to perform focusing from an infinite object to a short distance object. The F number determining member SP is disposed on the object side of the second lens unit L2 and moves together with the second lens unit L2 during zooming. The secondary aperture FP is disposed on the image side of the second lens unit L2 and moves together with the second lens unit L2 during zooming.

Next, an exemplary lens structure for obtaining a high zoom ratio supporting a large aperture ratio and good optical performance in the zoom lens of each embodiment is described. In the zoom lens of each embodiment, the secondary aperture FP having a constant aperture diameter is disposed on the image side of the second lens unit L2. The second lens unit L2 includes lens components 21 and 24 each having a positive refractive power disposed closest to the object side and closest to the image side, respectively. Here, the lens component is constituted of a single lens or a cemented lens including a positive lens and a negative lens that are cemented.

The distance on the optical axis between the lens surface that is closest to the image side in the second lens unit L2 and the secondary aperture FP is denoted by dd, and the focal length of the entire zoom lens at the wide angle end is denoted by fw. Then, the following conditional expression is satisfied:

$$0.10 < dd/fw < 0.40 \qquad (1)$$

The conditional expression (1) defines the interval between the lens surface that is closest to the image side in the second lens unit L2 and the secondary aperture FP. A role of the secondary aperture FP is to suppress coma flare of the upper light beam among light beams on the periphery of the screen due to a large aperture diameter. In view of cutting coma flare, it is preferred that the interval between the lens surface that is closest to the image side in the second lens unit L2 and the secondary aperture FP be larger, but there is an appropriate range of the interval in view of the following point.

If the interval dd increases beyond the upper limit value of the conditional expression (1), the distance between the second lens unit L2 and the secondary aperture FP on the optical axis becomes too large to cut the off-axial light beam effectively both at the wide angle end and at the telephoto end. In addition, at the wide angle end, light amount becomes insufficient at the periphery of the screen, which is undesirable.

If the interval dd decreases below the lower limit value of the conditional expression (1), the lens surface on the image plane side interferes with the secondary aperture FP, and hence it becomes difficult to arrange. Further, it becomes difficult to cut the off-axial light beam that becomes harmful in the zoom range from the wide angle end to the intermediate zoom region, and hence it becomes difficult to realize high performance, which is not desirable.

It is more preferred to set the numerical value range of the conditional expression (1) as follows:

$$0.11 < dd/fw < 0.30 \quad (1a)$$

According to this structure, a balance between the cutting of the harmful light of the off-axial light beam and the light amount at the periphery of the screen can be set more appropriately. Therefore, it becomes easy to obtain good optical performance in the entire zoom range.

By specifying the elements as described above, the wide field angle zoom lens is obtained which has a small size of the entire lens system and high optical performance in the entire zoom range. It is more preferred to satisfy one or more of the following conditions.

Imaging magnifications of the third lens unit L3 at the wide angle end and at the telephoto end are denoted by $\beta 3W$ and $\beta 3T$, respectively. The curvature radii of the lens surfaces of the lens component 24 having the positive refractive power disposed closest to the image side in the second lens unit L2 on the object side and on the image side are denoted by R2a and R2b, respectively. The thickness of the second lens unit L2 on the optical axis is denoted by D2. The focal length and the F number of the entire zoom lens at the wide angle end are denoted by fw and Fnow, respectively. The movement amounts in the optical axis direction of the first lens unit L1 and the second lens unit L2 during zooming from the wide angle end to the telephoto end are denoted by m1 and m2, respectively (a sign of the movement amount is positive when each lens unit moves to the image side and is negative when each lens unit moves to the object side).

In this case, it is preferred to satisfy one or more of the following conditional expressions:

$$1.0 < \beta 3T/\beta 3W < 1.2 \quad (2)$$

$$-5 < (R2a+R2b)/(R2a-R2b) < 0 \quad (3)$$

$$0.5 < (D2/fw)/Fnow < 1.0 \quad (4)$$

$$1.0 < m2/m1 < 10.0 \quad (5)$$

Next, technical meanings of the above-mentioned conditional expressions are described. The conditional expression (2) indicates a magnification share of the third lens unit L3. If the magnification share decreases below the lower limit of the conditional expression (2), it becomes difficult to obtain a sufficient zooming effect by the third lens unit L3. On the other hand, above the upper limit of the conditional expression (2), it becomes difficult to obtain a back focus having a sufficient length at the telephoto end, and at the same time, incident angle fluctuation of the light beam in the imaging plane increases during zooming from the wide angle end to the telephoto end. Therefore, much color shading occurs when the image pickup element is used.

The conditional expression (3) defines a lens shape of the lens component 24 disposed closest to the image side in the second lens unit L2. Below the lower limit of the conditional expression (3), the meniscus shape that is convex toward the object side becomes too steep. Therefore, the focal length of the lens component 24 increases, and hence the converging effect of the light beam on the image side becomes insufficient. As a result, the effective diameter of the lens on the object side in the second lens unit L2 increases, and hence it becomes difficult to correct aberrations in the zoom lens having a large diameter, in particular. Above the upper limit of the conditional expression (3), the curvature radius of the lens surface of the lens component 24 on the object side becomes too small to correct both the spherical aberration and the coma aberration while maintaining a long exit pupil.

The conditional expression (4) is a conditional expression for maintaining an appropriate length between the lens surface that is closest to the object side and the lens surface that is closest to the image side in the second lens unit L2. If the length D2 decreases below the lower limit of the conditional expression (4), the number of lenses is restricted in a small lens unit thickness, and hence it becomes difficult to maintain good optical performance. This is more difficult in achieving an object such as a wide field angle or a large diameter. Above the upper limit of the conditional expression (4), it becomes difficult to shorten the total lens length in the retracted state.

The conditional expression (5) defines a movement amount ratio between the first lens unit L1 and the second lens unit L2 during zooming. In the conditional expression (5), the movement amounts m1 and m2 indicate relative differences of each lens unit in the optical axis direction at the wide angle end and at the telephoto end. If the movement amount ratio decreases below the lower limit of the conditional expression (5), the movement amount of the second lens unit L2 as a main zooming lens unit becomes insufficient, and hence it becomes difficult to achieve a high zoom ratio. Above the upper limit of the conditional expression (5), the movement amount of the second lens unit L2 becomes too large. Therefore, a multi-stage retractable structure becomes necessary for reducing the camera thickness in the retracted state, and hence the retractable structure becomes complicated. The complicated retractable structure makes it difficult to secure deflection accuracy, and it becomes difficult to obtain good optical performance in the entire zoom range. On the other hand, if the movement amount of the first lens unit L1 becomes too small, incident height at which the off-axial light beam passes through the peripheral part of the lens becomes high, and hence the front lens effective diameter increases. Therefore, it is not desired in view of achieving a small lens barrel diameter.

In the above-mentioned conditional expressions (2) to (5), it is more preferred to set the numerical value ranges as follows, in view of aberration correction and so as to achieve a wide field angle, a high zoom ratio, and a small size of the entire lens:

$$1.0 < \beta 3T/\beta 3W < 1.1 \quad (2a)$$

$$-3.0 < (R2a+R2b)/(R2a-R2b) < -0.5 \quad (3a)$$

$$0.6 < (D2/fw)/Fnow < 0.9 \quad (4a)$$

$$2.0 < m2/m1 < 8.0 \quad (5a)$$

In each embodiment, by setting the elements as described above, it is possible to achieve the zoom lens constituted of a small number of lenses with a compact size of the entire system, having a magnification ratio of approximately four and good optical performance, which is suitable particularly for a retractable zoom lens and for an image pickup system using a solid-state image pickup element. Although the exemplary embodiments of the present invention are described above, the present invention is not limited to those embodiments, which can be modified and changed variously within the scope of the spirit thereof.

The zoom lens of each embodiment performs the main zooming by moving the second lens unit L2 and corrects the image plane variation accompanying zooming by moving the first lens unit L1 along the convex locus and by moving the third lens unit L3 in the image side direction. In particular, the third lens unit L3 shares an increase of the refractive power of each lens unit due to downsizing of the zoom lens, and hence the refractive power of a short zoom system constituted of the first lens unit L1 and the second lens unit L2. Thus, occurrence of aberrations in each lens constituting the first lens unit L1 is suppressed, and hence good optical performance is achieved. In addition, telecentric imaging on the image side that is necessary particularly for an image pickup apparatus using a solid-state image pickup element or the like is achieved by allowing the third lens unit L3 to have a role of a field lens.

In addition, in each embodiment, the light amount aperture stop SP that determines the F number is disposed on the object side of the second lens unit L2 so that the light amount is adjusted. In addition, the secondary aperture FP having a constant aperture diameter is disposed on the image side of the second lens unit L2 so as to cut a harmful light beam that deteriorates the optical performance. Specifically, when a large diameter is realized in the entire zoom range, the on-axial light beam diameter increases, and simultaneously the off-axial light beam also enters up to the height where the on-axial light beam passes through. Because a large amount of light beam enters, an upper light beam of the off-axial light beam causes coma flare that affects the optical performance. Therefore, the secondary aperture FP cuts the upper light beam of the off-axial light beam.

This secondary aperture FP is set to have an aperture diameter that does not cut the on-axial light beam at the telephoto end, and hence the coma flare due to the upper light beam of the off-axial light beam is cut as much as possible in the entire zoom range. Thus, high optical performance is obtained in the entire zoom range. In addition, the first lens unit L1 and the third lens unit L3 are disposed on both sides of the light amount aperture stop SP so that the lens units cancel various off-axial aberrations, and hence good optical performance can be obtained without increasing the number of lenses.

Next, the lens structure of the first embodiment illustrated in FIG. 1 is described. In FIG. 1, the first lens unit L1 is constituted of two lenses including, in order from the object side to the image side, a negative lens 11 having a concave surface facing the image side, and a positive lens 12 having a meniscus shape with a convex surface facing the object side. The first lens unit L1 has a role of forming an image of the off-axial principal ray at the center of the aperture stop SP. The first lens unit L1 has a large refracting amount of the off-axial principal ray on the wide angle side, and hence various off-axial aberrations, particularly astigmatism and distortion, are apt to occur.

Therefore, in this embodiment, similarly to a usual wide field angle lens, the lens structure includes the negative lens 11 and the positive lens 12, in which the increase of the diameter of the lens disposed closest to the object side can be suppressed. Further, the lens surface of the negative lens 11 on the object side has an aspherical shape in which the negative refractive index is larger as being closer to the lens periphery from the lens center, while the lens surface on the image side has an aspherical shape in which the negative refractive power is smaller as being closer to the lens periphery from the lens center. Thus, astigmatism is corrected appropriately, and the first lens unit L1 is constituted of as few as two lenses, to thereby downsize the entire lens. In addition, in order to constitute the first lens unit L1 of as few as two lenses, high refractive index material is used for each lens so that curvature of each lens surface becomes mild to downsize the entire lens in the radial direction.

In addition, the lens surfaces except the lens surface on the object side of the negative lens 11 constituting the first lens unit L1 have lens shapes that are similar to concentric spherical surfaces with the center being an intersection of the light amount aperture stop SP with the optical axis, so as to suppress occurrence of the off-axial aberration due to refraction of the off-axial principal ray. As one of the effective means for suppressing an increase of the front lens effective diameter due to the wide field angle, there is known a method of correcting the distortion in an electronic manner. It is because that a position of the off-axial light beam passing through the front lens effective diameter can be close to the optical axis by a process of decreasing the distortion in an electronic manner in the vicinity of the wide angle end where a negative distortion occurs. The lens surface of the negative lens 11 on the object side has a substantially flat surface in a paraxial manner so as to correct the field curvature while the distortion is permitted to such an extent that the electronic correction can be performed.

The second lens unit L2 includes, in order from the object side to the image side, a positive lens (lens component having a positive refractive power) 21 with a convex surface facing the object side, a positive lens 22 with a convex surface facing the object side, and a negative lens 23 with a concave surface facing the image side, and further a positive lens (lens component having a positive refractive power) 24 is disposed closest to the image side. The positive lens 22 and the negative lens 23 are cemented to each other so as to constitute a cemented lens. The lens component 24 is constituted of a single positive lens.

When a large diameter is realized at the wide angle end, the on-axial light beam in the vicinity of the light amount aperture stop SP is most diverged in the radial direction, and much aberration such as spherical aberration or coma aberration is generated. The aberration is generated when the light beam is refracted at the lens surface, and is generated more as the refraction at the lens surface becomes larger. Therefore, the positive lens 21 is disposed at a position on the optical axis where the on-axial light beam becomes highest in the radial direction on the image side of the light amount aperture stop SP, and the positive lens 21 has a lens shape with a convex surface facing the object side. In addition, the refractive power (i.e., optical power that is reciprocal of focal length) is set appropriately. Thus, the light beam is refracted mildly so that the occurrence of various aberrations is reduced. Further, both sides of the positive lens 21 have aspherical shapes so that spherical aberration is corrected effectively.

In this embodiment, the lens surface on the object side of the positive lens 21, which is disposed closest to the object side, has an aspherical shape in which the positive refractive index is decreased as being closer to the lens periphery from the lens center, to thereby correct spherical and coma aberration appropriately. In addition, the positive lens 22 having the convex surface facing the object side is disposed on the image plane side of the positive lens 21, to thereby obtain the lens structure of sharing the refraction of the light beam. As for the spherical aberration or the coma aberration generated when the light beam is refracted by the positive lens 21 and the positive lens 22, the lens surface shape of the negative lens 23 on the image side has the concave surface facing the image side to refract the light beam to the opposite side. Thus, the spherical aberration or the coma aberration generated by the positive lens 21 and the positive lens 22 is canceled (corrected).

In order to cancel the aberration generated by the two lenses, the positive lens 21 and the positive lens 22, it is necessary that the curvature of the lens surface of the negative lens 23 on the image side have a refractive power to some extent. In particular, it is necessary to optimize the lens surface shapes of the positive lens 21, the positive lens 22, and the negative lens 23, for correcting the spherical aberration. A position of the second lens unit L2 on the optical axis at the wide angle end is determined by a refractive power arrangement of the entire lens system. In order to ensure high optical performance with a large aperture ratio, the positions of the positive lens 21, the positive lens 22, and the negative lens 23 are determined to be appropriate positions on the optical axis.

Specifically, the large diameter makes the focal depth shallow at the wide angle end, and hence it is important to correct the field curvature. If the refractive power of the entire zoom lens is not optimized, a Petzval sum is deviated from the optimal value. Consequently, it becomes difficult to correct the field curvature appropriately and to realize high performance. When optimal refractive power distribution of the entire zoom lens is performed in this way, it is necessary to dispose the positive lens 21, the positive lens 22, and the negative lens 23, which perform mainly the aberration correction, of the second lens unit L2 at positions separated from the image plane to some extent. For instance, when the positive refractive power of the second lens unit L2 is enhanced, the positive lens 21, the positive lens 22, and the negative lens 23 are close to the image plane, which is advantageous to realize the entire compact zoom lens or a high magnification. However, the Petzval sum becomes too small to correct the field curvature.

In addition, in order to achieve a large aperture ratio, it is preferred that a final lens constituting the second lens unit L2 have a positive refractive power. As to the on-axial light beam of a large diameter lens, an angle of the marginal light beam entering the image plane IP is larger as the diameter becomes larger. Therefore, the positive lens component 24 is disposed in the vicinity of the image plane so that the on-axial light beam is refracted. Otherwise, the positive lens 21 having the highest on-axial light beam at the wide angle end becomes large in the radial direction.

As a result, it becomes difficult to make the zoom lens compact, and to correct spherical aberration and coma aberration appropriately. Therefore, in addition to the third lens unit L3 as a positive lens unit disposed in the vicinity of the image plane, the lens disposed closest to the image plane in the second lens unit L2 has a positive lens component. Thus, the positive refractive power is shared so that occurrence of spherical aberration and increase of the lens diameter are suppressed.

As described above, in order to suppress spherical aberration due to a large diameter in particular, the positive lens component 24 is disposed close to the positions of the positive lens 21, the positive lens 22, and the negative lens 23 and closest to the image side of the second lens unit L2. When the positive lens component 24 is disposed close to the positive lens 21, the positive lens 22, and the negative lens 23 so as to downsize the entire zoom lens, it becomes difficult to correct field curvature due to the refractive power arrangement of the second lens unit L2 and to reduce variation of spherical aberration during zooming.

Next, the third lens unit L3 is constituted of a positive lens 31 having a convex surface on the object side, and has a role as a field lens for realizing image side telecentric. When the back focus is denoted by sk', the focal length of the third lens unit L3 is denoted by f3, and the imaging magnification of the third lens unit L3 is denoted by β3, the following relationship is satisfied:

$$sk'=f3(1-\beta 3)$$

where $0<\beta 3<1.0$.

When the third lens unit L3 is moved to the image side during zooming from the wide angle end to the telephoto end, the back focus sk' is decreased, and the imaging magnification β3 of the third lens unit L3 increases on the telephoto side. Then, the zooming can be shared by the third lens unit L3 as a result, to thereby reduce the movement amount of the second lens unit L2 during zooming. Further, when the movement amount of the second lens unit L2 is reduced, the space can be saved so that the entire zoom lens can be downsized easily.

When taking an image from an infinite object to a short distance object by using the zoom lens of this embodiment, the first lens unit L1 is moved to the object side to obtain good performance. It is more desired to move the third lens unit L3 to the object side as indicated by the arrow F. When focusing is performed by the third lens unit L3, increase of the front lens effective diameter can be reduced, which occurs when focusing is performed by the first lens unit L1 disposed closest to the object side.

Further, when the first lens unit L1 having a largest lens weight is moved, a load on the actuator increases. When focus is performed by the third lens unit L3, a load on the actuator can be reduced. Further, the first lens unit L1 and the second lens unit L2 can be linked simply via a cam or the like so as to move during zooming, to thereby simplify the mechanical structure and achieve high accuracy.

In addition, in this embodiment, the third lens unit L3 is moved to the image side during zooming from the wide angle end to the telephoto end. Thus, a large space can be provided for moving the third lens unit L3 at the telephoto end where the movement amount of the third lens unit L3 increases during focusing. Therefore, the space for the movement of the third lens unit L3 that is necessary for zooming and focusing can be minimized, which facilitates obtaining a compact lens system.

The lens structures of the second embodiment and the third embodiment are the same as that of the first embodiment. The lens structure of the fourth embodiment is different from that of the first embodiment in that the lens disposed closest to the image side in the second lens unit L2 is constituted of a cemented lens (lens component) having a positive refractive power including the positive lens 24 and the negative lens 25 that are cemented to each other. Other structures are the same. Specifically, in the fourth embodiment, the second lens unit L2 includes, in order from the object side to the image side, the positive lens 21, the positive lens 22, the negative lens 23, and the cemented lens (lens component) 24 including the positive lens 24 and the negative lens 25, which is disposed closest to the image side. The cemented lens surface of the lens component 24 suppresses high order coma aberration, and appropriately corrects longitudinal chromatic aberration and lateral chromatic aberration simultaneously over the entire zoom range.

In particular, it is effective for correcting aberration generated when the second lens unit L2 is moved in the direction perpendicular to the optical axis as a so-called vibration preventing operation so as to correct a blur image on the image plane due to camera shake in the image-taking operation. In each embodiment, the light amount aperture stop SP and the secondary aperture FP are moved together with the second lens unit L2 during zooming for simplification of the mechanism, but different loci may be set appropriately. In this case, a more compact optical system can be obtained with ease.

Next, an embodiment of a digital camera (image pickup apparatus) in which the zoom lens of the present invention is used as an image taking optical system is described with reference to FIG. 9. In FIG. 9, the digital camera includes a digital camera main body 120 and an image taking optical system 121 constituted of the zoom lens according to the embodiments described above. The digital camera further includes an image pickup element (solid-state image pickup element) 122 such as a CCD that receives light of a subject image via the image taking optical system 121.

In this embodiment, an image recording region in the image pickup element 122 is different between the wide angle end and the telephoto end. Specifically, the image recording region is larger at the telephoto end. Thus, a balance of optical performance in the entire screen is maintained appropriately. The digital camera also includes a recording unit 123 that records the subject image received by the image pickup element 122. The digital camera also includes a finder 124 for observing the subject image displayed on a display element (not shown). The display element is constituted of a liquid crystal panel or the like, on which the subject image formed on the image pickup element 122 is displayed. In this way, the zoom lens of the present invention is applied to the image pickup apparatus such as a digital camera, to realize a small image pickup apparatus having high optical performance.

Next, numerical embodiments corresponding to the embodiments of the present invention are described. In each numerical embodiment, a surface number i indicates an order of the surface from the object side. A curvature radius of the lens surface is denoted by ri corresponding to the surface number i. A lens thickness and air interval between the i-th surface and the (i+1)th surface is denoted by di, and a refractive index and an Abbe number with respect to the d-line are denoted by ndi and vdi, respectively. In addition, two surfaces closest to the image side correspond to a glass material such as a face plate. In addition, aspheric surface coefficients are denoted by k, B, C, D, and E. As to the aspherical shape, a displacement x in the optical axis direction with respect to the surface apex at a position of height h from the optical axis is expressed by the following equation:

$$x=(h^2/R)/[1+\{1-(1+k)(h/R)^2\}^{1/2}]+Bh^4+Ch^6+Dh^8+Eh^{10}$$

where R is the curvature radius. Note that, the back focus BF is indicated as an air-converted length from the lens surface closest to the image side. In addition, a relationship between each conditional expression described above and each numerical embodiment is shown in Table 1.

Numerical Embodiment 1

Unit: mm

| Surface data | | | | |
|---|---|---|---|---|
| Surface Number | r | d | nd | vd |
| 1* | ∞ | 1.20 | 1.84954 | 40.1 |
| 2* | 5.548 | 2.31 | | |
| 3 | 10.293 | 1.60 | 1.92286 | 18.9 |
| 4 | 21.778 | (Variable) | | |
| 5 (Aperture) | 0.50 | | | |
| 6* | 6.486 | 2.30 | 1.74330 | 49.3 |
| 7* | 275.040 | 0.20 | | |
| 8 | 6.768 | 1.65 | 1.77250 | 49.6 |
| 9 | 48.200 | 0.50 | 2.00069 | 25.5 |
| 10 | 3.987 | 1.65 | | |
| 11 | 11.981 | 1.40 | 1.83481 | 42.7 |
| 12 | 65.410 | 0.60 | | |
| 13 | Secondary aperture | (Variable) | | |
| 14 | 16.391 | 1.70 | 1.48749 | 70.2 |
| 15 | −21.482 | (Variable) | | |
| 16 | ∞ | 0.95 | 1.51633 | 64.1 |
| 17 | ∞ | 1.05 | | |
| Image plane | ∞ | | | |

| Aspherical surface data |
|---|

First surface

K = 7.54512e+008  B = 1.88618e−004  C = 6.44928e−006
D = −6.21908e−008  E = −6.47132e−014

Second surface

K = 2.34707e+000  B = 1.05626e−003  C = −2.43088e−005
D = 6.21908e−008  E = −1.85511e−008

Sixth surface

K = −1.83908e−001  B = −2.23674e−004  C = 2.76144e−009
D = −1.83041e−007  E = −4.63046e−009

Seventh surface

K = 4.86718e+003  B = −5.35130e−005  C = −6.71896e−007
D = 4.03626e−007  E = −4.23510e−008

| Various data |
|---|
| Zoom ratio 3.80 |

| | Wide angle | Intermediate | Telephoto |
|---|---|---|---|
| Focal length | 5.00 | 9.70 | 19.00 |
| F number | 2.06 | 4.00 | 5.50 |
| Field angle | 34.21 | 21.78 | 11.53 |
| Image height | 3.40 | 3.88 | 3.88 |
| Total lens length | 38.72 | 35.92 | 43.05 |
| BF | 3.95 | 3.85 | 3.67 |
| d4 | 15.46 | 6.60 | 1.99 |
| d13 | 3.69 | 9.84 | 21.78 |
| d15 | 2.27 | 2.18 | 1.99 |

| Zoom lens unit data | | |
|---|---|---|
| Unit | First surface | Focal length |
| 1 | 1 | −11.09 |
| 2 | 5 | 10.90 |
| 3 | 14 | 19.36 |
| 4 | 16 | ∞ |

Numerical Embodiment 2

Unit: mm

Surface data

| Surface Number | r | d | nd | νd |
|---|---|---|---|---|
| 1* | 12734.763 | 1.10 | 1.84954 | 40.1 |
| 2* | 5.371 | 2.47 | | |
| 3 | 10.589 | 1.60 | 1.92286 | 18.9 |
| 4 | 23.646 | (Variable) | | |
| 5 (Aperture) | ∞ | 0.50 | | |
| 6* | 6.488 | 2.30 | 1.74330 | 49.3 |
| 7* | 272.676 | 0.30 | | |
| 8 | 7.143 | 1.75 | 1.80610 | 40.9 |
| 9 | −29.354 | 0.50 | 2.00069 | 25.5 |
| 10 | 4.173 | 1.45 | | |
| 11 | 12.296 | 1.20 | 1.83481 | 42.7 |
| 12 | 95.801 | 1.30 | | |
| 13 | Secondary aperture | (Variable) | | |
| 14 | 14.891 | 1.70 | 1.58313 | 59.4 |
| 15 | −35.565 | (Variable) | | |
| 16 | ∞ | 0.95 | 1.51633 | 64.1 |
| 17 | ∞ | 1.05 | | |
| Image plane | ∞ | | | |

Aspherical surface data

First surface

K = −7.54512e+008   B = −4.96945e−005   C = 9.80089e−007
D = −2.93189e−009

Second surface

K = −1.84750e+000   B = 8.96608e−004   C = −1.32261e−005
D = 3.88560e−007   E = −4.26518e−009

Sixth surface

K = 6.66357e−002   B = −1.78667e−004   C = 2.32749e−006
D = 2.74312e−007   E = 1.90745e−008

Seventh surface

K = −7.13425e+002   B = 1.81194e−004   C = 1.34182e−005
D = 7.10950e−007

Various data

Zoom ratio 3.88

| | Wide angle | Intermediate | Telephoto |
|---|---|---|---|
| Focal length | 4.90 | 9.63 | 19.00 |
| F number | 2.06 | 4.60 | 5.70 |
| Field angle | 34.76 | 21.92 | 11.53 |
| Image height | 3.40 | 3.88 | 3.88 |
| Total lens length | 37.79 | 35.53 | 43.44 |
| BF | 3.95 | 3.86 | 3.67 |
| d4 | 14.63 | 6.02 | 1.62 |
| d13 | 3.04 | 9.48 | 21.98 |
| d15 | 2.27 | 2.18 | 2.00 |

Zoom lens unit data

| Unit | First surface | Focal length |
|---|---|---|
| 1 | 1 | −10.82 |
| 2 | 5 | 10.79 |
| 3 | 14 | 18.23 |
| 4 | 16 | ∞ |

Numerical Embodiment 3

Unit: mm

Surface data

| Surface Number | r | d | nd | νd |
|---|---|---|---|---|
| 1* | ∞ | 1.15 | 1.84954 | 40.1 |
| 2* | 5.673 | 2.78 | | |
| 3 | 11.409 | 1.60 | 1.94595 | 18.0 |
| 4 | 24.393 | (Variable) | | |
| 5 (Aperture) | ∞ | 0.50 | | |
| 6* | 7.463 | 2.25 | 1.74330 | 49.3 |
| 7* | 108.420 | 0.17 | | |
| 8 | 6.134 | 1.65 | 1.58313 | 59.4 |
| 9 | 32.173 | 0.50 | 1.80518 | 25.4 |
| 10 | 4.212 | 1.60 | | |
| 11 | 18.372 | 1.35 | 1.69680 | 55.5 |
| 12 | −90.741 | 0.80 | | |
| 13 | Secondary aperture | (Variable) | | |
| 14 | 25.681 | 1.70 | 1.69680 | 55.5 |
| 15 | −27.341 | (Variable) | | |
| 16 | ∞ | 0.87 | 1.51633 | 64.1 |
| 17 | ∞ | 1.02 | | |
| Image plane | ∞ | | | |

Aspherical surface data

First surface

K = −7.54512e+008   B = −2.87622e−004   C = 1.08335e−005
D = −1.50001e−007   E = 4.89614e−010

Second surface

K = −2.42402e+000   B = 8.66826e−004   C = −1.78319e−005
D = 1.00852e−006   E = −2.01684e−008

Sixth surface

K = −9.46174e−002   B = −1.28264e−004   C = −1.33414e−007
D = −2.18122e−007   E = 7.36760e−009

Seventh surface

K = 6.28037e+002   B = −2.77000e−005   C = −7.04871e−007
D = −2.44718e−007

Various data

Zoom ratio 3.66

| | Wide angle | Intermediate | Telephoto |
|---|---|---|---|
| Focal length | 5.00 | 9.50 | 18.30 |
| F number | 2.06 | 4.00 | 5.40 |
| Field angle | 34.22 | 22.19 | 11.96 |
| Image height | 3.40 | 3.88 | 3.88 |
| Total lens length | 42.80 | 38.98 | 45.52 |
| BF | 3.79 | 3.75 | 3.69 |
| d4 | 17.52 | 7.62 | 2.33 |
| d13 | 5.44 | 11.56 | 23.45 |
| d15 | 2.20 | 2.16 | 2.10 |

Zoom lens unit data

| Unit | First surface | Focal length |
|---|---|---|
| 1 | 1 | −11.33 |
| 2 | 5 | 11.91 |
| 3 | 14 | 19.26 |
| 4 | 16 | ∞ |

Numerical Embodiment 4

Unit: mm

Surface data

| Surface Number | r | d | nd | vd |
|---|---|---|---|---|
| 1* | ∞ | 1.10 | 1.84954 | 40.1 |
| 2* | 5.511 | 2.45 | | |
| 3 | 10.987 | 1.65 | 1.92286 | 18.9 |
| 4 | 25.026 | (Variable) | | |
| 5 (Aperture) | | 0.50 | | |
| 6* | 6.568 | 2.30 | 1.74330 | 49.3 |
| 7* | 93.533 | 0.30 | | |
| 8 | 7.938 | 1.75 | 1.69680 | 55.5 |
| 9 | 139.682 | 0.50 | 1.80518 | 25.4 |
| 10 | 4.158 | 1.51 | | |
| 11 | 12.296 | 1.10 | 1.77250 | 49.6 |
| 12 | 1000.000 | 0.50 | 1.67270 | 32.1 |
| 13 | 72.349 | 0.80 | | |
| 14 | Secondary aperture | (Variable) | | |
| 15 | 20.460 | 1.80 | 1.69680 | 55.5 |
| 16 | −39.629 | (Variable) | | |
| 17 | ∞ | 0.80 | 1.51633 | 64.1 |
| 18 | ∞ | 1.05 | | |
| Image plane | ∞ | | | |

Aspherical surface data

First surface

K = −7.54512e+008  B = −2.46508e−004  C = 6.79083e−006
D = −6.67188e−008

Second surface

K = −2.02468e+000  B = 6.91338e−004  C = −1.25842e−005
D = 6.74373e−007  E = −1.23693e−008

Sixth surface

K = −1.54106e−001  B = −9.72565e−005  C = 7.59742e−007
D = 3.71776e−007  E = 1.96615e−008

Seventh surface

K = −4.74766e+002  B = 2.74698e−004  C = 2.64827e−006
D = 1.08338e−006

Various data

Zoom ratio 3.61

| | Wide angle | Intermediate | Telephoto |
|---|---|---|---|
| Focal length | 5.07 | 9.50 | 18.29 |
| F number | 1.94 | 4.60 | 5.20 |
| Field angle | 33.87 | 22.19 | 11.96 |
| Image height | 3.40 | 3.88 | 3.88 |
| Total lens length | 38.27 | 35.54 | 41.93 |
| BF | 3.88 | 3.78 | 3.57 |
| d4 | 14.48 | 6.09 | 1.48 |
| d14 | 3.65 | 9.42 | 20.62 |
| d16 | 2.30 | 2.20 | 2.00 |

Zoom lens unit data

| Unit | First surface | Focal length |
|---|---|---|
| 1 | 1 | −11.06 |
| 2 | 5 | 10.84 |
| 3 | 15 | 19.61 |
| 4 | 17 | ∞ |

TABLE 1

| Conditional expression | | Numerical embodiment 1 | Numerical embodiment 2 | Numerical embodiment 3 | Numerical embodiment 4 |
|---|---|---|---|---|---|
| (1) | dd/fw | 0.12 | 0.27 | 0.16 | 0.16 |
| (2) | β3T/β3w | 1.02 | 1.02 | 1.01 | 1.02 |
| (3) | (R2a + R2b)/(R2a − R2b) | −1.45 | −1.29 | −0.66 | −1.41 |
| (4) | D2/fw/Fnow | 0.75 | 0.74 | 0.73 | 0.81 |
| (5) | m2/m1 | 4.11 | 3.30 | 6.59 | 4.55 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-260832, filed Nov. 16, 2009, which is hereby incorporated by reference herein in its entirety.

What is claimed is:

1. A zoom lens comprising:
a first lens unit having a negative refractive power, a second lens unit having a positive refractive power, and a third lens unit having a positive refractive power, in order from an object side to an image side;
an aperture stop that determines an F-number disposed on the object side of the second lens unit, to adjust light amount;
a secondary aperture having a constant aperture diameter disposed on the image side of the second lens unit,
wherein all the first lens unit, the second lens unit, and the third lens unit move during zooming,
wherein the second lens unit includes lens components having a positive refractive powers disposed at a position closest to the object side and a position closest to the image side, and
wherein the following condition is satisfied:

$$0.10 < dd/fw < 0.40,$$

where dd denotes a distance on an optical axis between a lens surface closest to the image side in the second lens unit and the secondary aperture, and fw denotes a focal length of the entire zoom lens at a wide angle end.

2. A zoom lens according to claim 1, wherein the following condition is satisfied:

$$1.0 < \beta 3T/\beta 3W < 1.2,$$

where β3W and β3T denote imaging magnifications of the third lens unit at the wide angle end and at a telephoto end, respectively.

3. A zoom lens according to claim 1, wherein the following condition is satisfied:

$$-5 < (R2a+R2b)/(R2a-R2b) < 0,$$

where R2a and R2b denote curvature radii of lens surfaces on the object side and on the image side of the lens component closest to the image side in the second lens unit, respectively.

4. A zoom lens according to claim 1, wherein the following condition is satisfied:

$$0.5 < (D2/fw)/Fnow < 1.0,$$

where D2 denotes a thickness of the second lens unit on the optical axis, and fw and Fnow denote the focal length and an F number of the entire zoom lens at the wide angle end, respectively.

5. A zoom lens according to claim 1, wherein the first lens unit includes, in order from the object side to the image side, a negative lens and a positive lens.

6. A zoom lens according to claim 1, wherein the following condition is satisfied:

$$1.0 < m2/m1 < 10.0,$$

where m1 and m2 denote movement amounts in an optical axis direction of the first lens unit and the second lens unit during zooming from the wide angle end to the telephoto end, respectively.

7. A zoom lens according to claim 1, wherein:
the second lens unit includes, in order from the object side to the image side:
  a positive lens having a convex surface facing the object side;
  a cemented lens in which a positive lens having a convex surface facing the object side and a negative lens having a concave surface facing the image side are cemented; and
  a lens component having a positive refractive power, and
the lens component is constituted of one of a single positive lens or a cemented lens in which a positive lens and a negative lens are cemented.

8. A zoom lens according to claim 1, wherein the third lens unit moves to the object side during focusing from an infinite object to a short distance object.

9. An image pickup apparatus comprising:
a zoom lens comprising:
  a first lens unit having a negative refractive power, a second lens unit having a positive refractive power, and a third lens unit having a positive refractive power, in order from an object side to an image side;
  an aperture stop that determines an F-number disposed on the object side of the second lens unit, to adjust light amount;
  a secondary aperture having a constant aperture diameter disposed on the image side of the second lens unit,
  wherein all the first lens unit, the second lens unit, and the third lens unit move during zooming,
  wherein the second lens unit includes lens components having a positive refractive powers disposed at a position closest to the object side and a position closest to the image side, and
  wherein the following condition is satisfied:

$$0.10 < dd/fw < 0.40,$$

where dd denotes a distance on an optical axis between a lens surface closest to the image side in the second lens unit and the secondary aperture, and fw denotes a focal length of the entire zoom lens at a wide angle end; and
a solid-state image pickup element that receives light of an image formed by the zoom lens.

10. An image pickup apparatus according to claim 9, wherein the solid-state image pickup element has image recording regions different between a wide angle end and a telephoto end.

11. A zoom lens comprising:
a first lens unit having a negative refractive power, a second lens unit having a positive refractive power, and a third lens unit having a positive refractive power, in order from an object side to an image side;
an aperture stop that determines an F-number disposed between the first lens unit and the third lens unit, to adjust light amount;
a secondary aperture having a constant aperture diameter disposed on the image side of the second lens unit,
wherein all the first lens unit, the second lens unit, and the third lens unit move during zooming,
wherein the second lens unit includes lens components having a positive refractive powers disposed at a position closest to the object side and a position closest to the image side, and
wherein the following condition is satisfied:

$$0.10 < dd/fw < 0.40,$$

where dd denotes a distance on an optical axis between a lens surface closest to the image side in the second lens unit and the secondary aperture, and fw denotes a focal length of the entire zoom lens at a wide angle end.

* * * * *